US006547272B1

(12) United States Patent
Klozik et al.

(10) Patent No.: US 6,547,272 B1
(45) Date of Patent: Apr. 15, 2003

(54) AIR BAG MODULE WITH COVER AND REACTION STRUCTURE FOR WITHSTANDING LATERAL FORCE OF BAG INFLATION

(75) Inventors: Mark M. Klozik, Shelby Township, MI (US); Daniel G. Alcini, Shelby Township, MI (US); Jerri A. Brachel, Macomb, MI (US); Chienhom Lee, Rochester Hills, MI (US); Gregory R. Kigar, Toledo, OH (US)

(73) Assignees: TRW Vehicle Safety Systems Inc., Lyndhurst, OH (US); DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/571,575

(22) Filed: May 15, 2000

(51) Int. Cl.$^7$ ............................................... B60R 21/16
(52) U.S. Cl. .................................... 280/728.2; 280/731
(58) Field of Search ............................. 280/728.2, 731, 280/728.3

(56) References Cited

U.S. PATENT DOCUMENTS

| 4,903,986 | A | * | 2/1990 | Cok et al. | 280/728.2 |
|---|---|---|---|---|---|
| 5,004,266 | A | * | 4/1991 | Miller et al. | 280/743.2 |
| 5,009,452 | A | * | 4/1991 | Miller | 280/731 |
| 5,348,339 | A | * | 9/1994 | Turner | 280/732 |
| 5,435,593 | A | * | 7/1995 | Hiramitsu et al. | 280/728.2 |
| 5,520,411 | A | * | 5/1996 | Lang et al. | 280/728.3 |
| 5,539,259 | A | * | 7/1996 | Filion et al. | 280/728.3 |
| 5,577,768 | A | * | 11/1996 | Taguchi et al. | 280/728.2 |
| 5,580,082 | A | * | 12/1996 | Shiga et al. | 280/731 |
| 5,685,557 | A | * | 11/1997 | Persson et al. | 280/728.2 |
| 5,782,481 | A | * | 7/1998 | Magoteaux | 280/728.2 |
| 5,799,970 | A | * | 9/1998 | Enders | 280/728.2 |
| 5,833,262 | A | * | 11/1998 | Fujita et al. | 280/728.2 |
| 5,851,023 | A | * | 12/1998 | Nagata et al. | 280/728.2 |
| 5,992,875 | A | * | 11/1999 | Cundill | 280/728.2 |
| 6,260,876 | B1 | * | 7/2001 | Froude et al. | 280/728.3 |
| 6,276,711 | B1 | * | 8/2001 | Kurz et al. | 280/728.2 |
| 6,286,858 | B1 | * | 9/2001 | Shepherd et al. | 280/728.2 |
| 6,364,341 | B1 | * | 4/2002 | Perkins et al. | 280/728.2 |
| 6,419,261 | B1 | * | 7/2002 | Ibe | 280/728.2 |

FOREIGN PATENT DOCUMENTS

JP     2001-146142 A  *  5/2001   ........... B60R/21/20

* cited by examiner

*Primary Examiner*—Paul N. Dickson
*Assistant Examiner*—Joselynn Y Sliteris
(74) *Attorney, Agent, or Firm*—Tarolli, Sundheim, Covell & Tummino L.L.P.

(57) ABSTRACT

An apparatus (10) for helping to protect a vehicle occupant comprises an inflatable vehicle occupant protection device (12), an inflator (14), a cover (16), and a reaction plate (18). The inflator (14) provides inflation fluid to inflate the inflatable device (12). The cover (16) at least partially encloses the inflatable device (12) and the inflator (14). The cover (16) has a front panel (20), which faces a vehicle occupant, and side panels (22), which laterally surround the inflatable device (12). The reaction plate (18) has a base plate portion (56) to which the inflatable device (12), the inflator (14), and the cover (16) are attached. The reaction plate (18) has at least one projection (77, 88) extending from the base plate portion (56). The at least one projection (77, 88) overlies at least a portion of at least one of the side panels (22) of the cover (16) to resist deformation of the at least one side panel laterally away from the inflator (14) as the inflatable device (12) inflates.

19 Claims, 3 Drawing Sheets

AIR BAG MODULE WITH COVER AND REACTION STRUCTURE FOR WITHSTANDING LATERAL FORCE OF BAG INFLATION

BACKGROUND OF THE INVENTION

1. Field of the Invention

The present invention relates to an inflatable vehicle occupant protection device and, in particular, to an air bag module having a cover.

2. Description of the Prior Art

An inflatable vehicle occupant protection device is used in a vehicle to protect an occupant during an emergency situation. Such a device includes an air bag and an inflator for providing inflation fluid for inflating the air bag. The inflator and the air bag are attached to a reaction plate. A cover, which covers the air bag, is also attached to the reaction plate. When an emergency is sensed, a signal is transmitted to the inflator to actuate the inflator to inflate the air bag. During inflation of the air bag, the air bag ruptures the cover at a tear seam in the cover and expands into the vehicle occupant compartment. The inflated air bag acts as a cushioning device to prevent or reduce the force of the vehicle occupant's impact with parts of the vehicle.

To protect an occupant during a collision, an air bag must inflate at a high rate of speed. The outward expansion of the air bag imparts a force toward the vehicle occupant. Methods are available to control this outward force. One such method includes folding the air bag in a manner causing the air bag to inflate initially primarily in a lateral direction and secondarily in an outward direction. Although the folding of the air bag limits the inflation force directed outwardly toward the occupant, the lateral force of the inflating air bag may tend to deform, and could rupture, the side panels of the cover. The deformation and possible rupturing of the side panels could affect the proper deployment of the air bag.

SUMMARY OF THE INVENTION

The present invention is an apparatus for helping to protect a vehicle occupant. The apparatus comprises an inflatable vehicle occupant protection device, an inflator, a cover, and a reaction plate. The inflator provides inflation fluid to inflate the inflatable device. The cover at least partially encloses the inflatable device and the inflator. The cover has a front panel, which faces a vehicle occupant, and side panels, which laterally surround the inflatable device. The reaction plate has a base plate portion to which the inflatable device, the inflator, and the cover are attached. The reaction plate has at least one projection extending from the base plate portion. The at least one projection overlies at least a portion of at least one of the side panels of the cover to resist deformation of the at least one side panel laterally away from the inflator as the inflatable device inflates.

A feature of the present invention is that the cover and the at least one projection have interlocking portions which become interlocked during relative movement of the cover toward the base plate portion during assembly. The interlocking portions help retain the cover and the reaction plate together.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
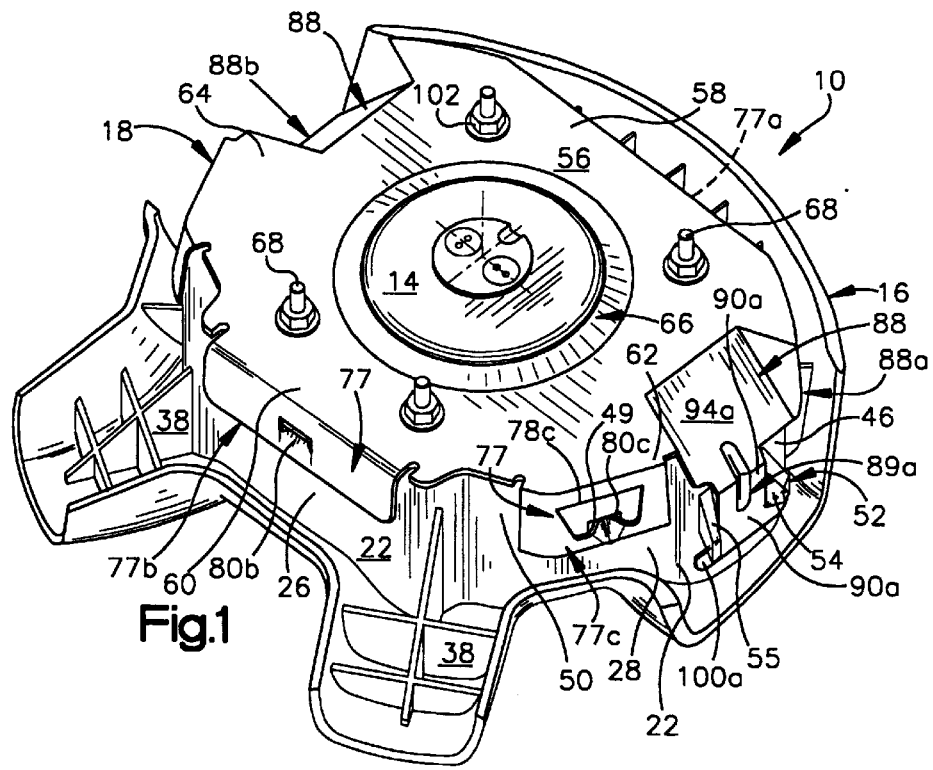
FIG. 1 is a schematic perspective view of an apparatus embodying the present invention.

FIGS. 1–5 illustrate an apparatus 10 embodying the present invention. The apparatus 10 includes an inflatable vehicle occupant protection device 12 (FIG. 5), an inflator 14 (FIG. 1), a cover 16, and a reaction plate 18. The apparatus 10 mounts in the central portion of a steering wheel (not shown) of a vehicle. Occupant protection apparatus in accordance with other embodiments of the present invention may be located in other locations in the vehicle.

Figure 4:
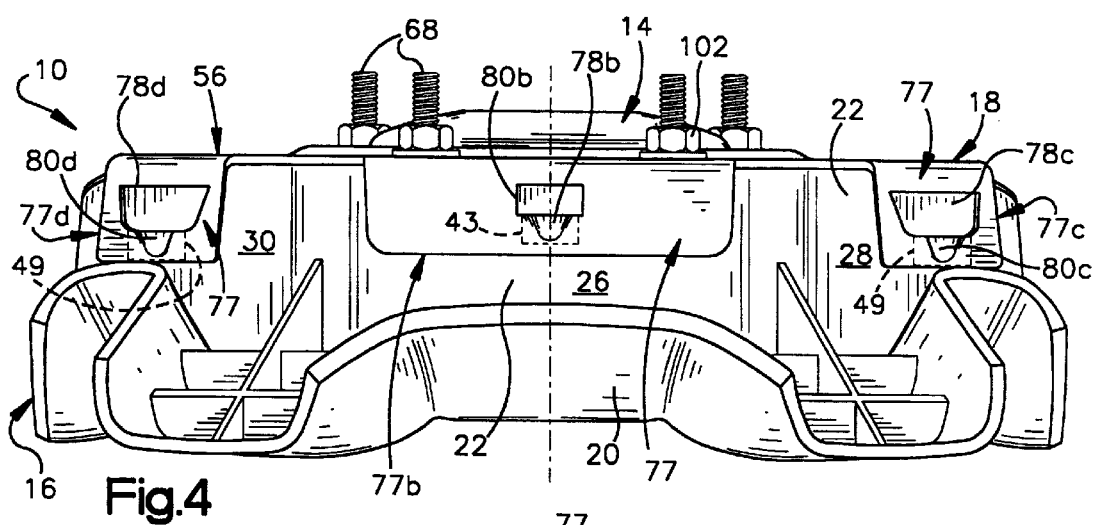
FIG. 4 is a bottom plan view of the apparatus of FIG. 2 taken along line 4—4 of FIG. 2.
Figure 5:
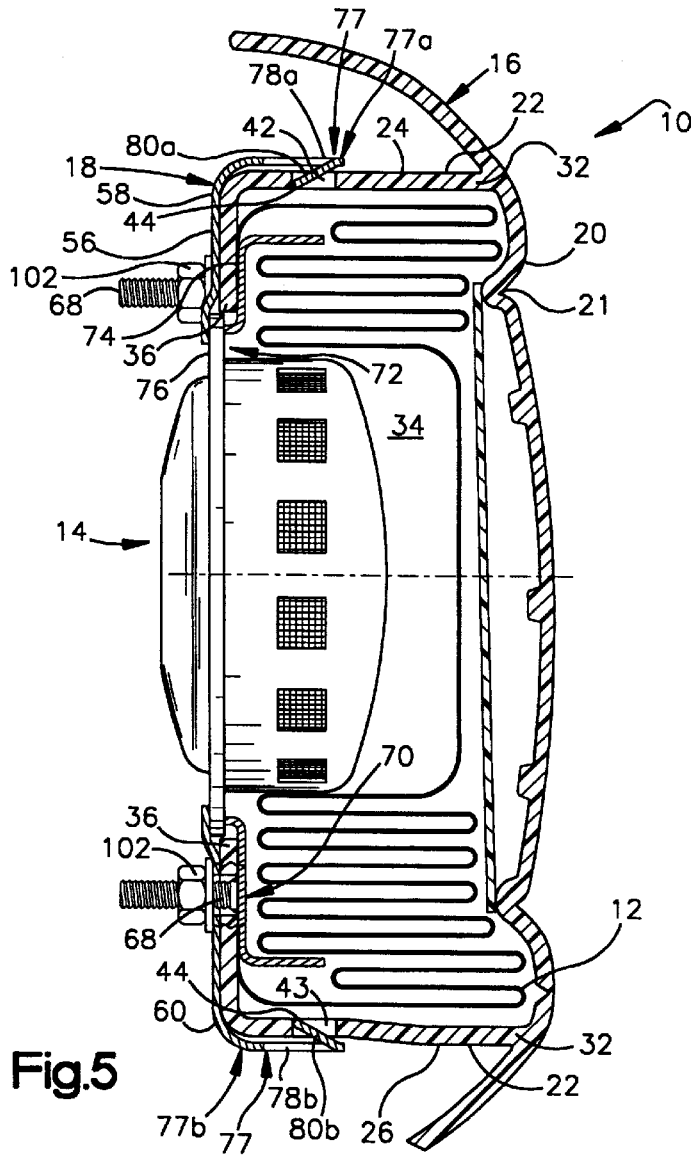
FIG. 5 is a cross-sectional view of the apparatus of FIG. 2, taken along line 5—5 of FIG. 2.

The cover 16 is formed as one piece, preferably by molding from a homogeneous thermoplastic material. The shape, color, and exterior texture of the cover 16 may be selected to match the environment in which the apparatus 10 is mounted. The cover 16 includes a front panel 20 (FIGS. 4 and 5). The front panel 20 faces the vehicle occupant and may include a resilient, depressible section for actuating a horn switch (not shown). A tear seam 21 (FIG. 5) is located on the front panel 20. The tear seam 21 is rupturable under the force of the inflating protection device 12 to allow the protection device to deploy into the vehicle occupant compartment.

The cover 16 includes four side panels, designated as a group 22, which extend inwardly (that is, away from the vehicle driver) from the front panel 20. The four side panels 22 include an upper side panel 24 (FIG. 5), a lower side panel 26, a left side panel 28 (FIGS. 2 and 5), and a right side panel 30 (FIG. 4). The forward ends 32 (FIG. 5) of the side panels 22 attach to the front panel 20 near its periphery. The upper and lower side panels 24 and 26 are substantially planar. The left and right side panels 28 and 30 are curved, and are contiguous with and interconnect the upper and lower side panels 24 and 26.

The four side panels 22 extend around and enclose a central chamber 34 (FIG. 5) in the cover 16. Terminal ends 36 of the side panels 22 define an opening to the chamber 34. In addition to the front panel 20 and the side panels 22, the cover 16 may include a number of ribs 38 (FIGS. 1 and 2) extending between the side panels 22 and the front panel 20. The ribs 38 provide lateral support to the side panels 22.

The upper and lower side panels 24 and 26 of the cover 16 have openings 42 and 43, respectively, for interlocking with the reaction plate 18. The openings 42 and 43 are centrally located along the length of the respective side panels 24, 26. Each opening 42, 43 is partially defined by a flat surface 44 (FIG. 5) forming a side of the opening nearest the terminal end 36 of the respective side panel 24, 26.

The left and right side panels 28 and 30 of the cover 16 are mirror images of each other. Each one of the left and right side panels 28 and 30 has a planar portion 46 located between an upper curved portion 48 and a lower curved portion 50. The upper curved portions 48 of the left and right side panels 28 and 30 are adjacent to and merge with the upper side panel 24. The lower curved portions 50 of the left and right side panels 28 and 30 are adjacent to and merge with the lower side panel 26.

Each one of the two lower curved portions 50 of the left and the right side panels 28 and 30 has a respective opening 49 for interlocking with a portion of the reaction plate 18. Each opening 49 is partially defined by a flat surface 51 (FIG. 3) forming the side of the opening nearest the terminal end 36 of the respective side panel 28, 30.

Each one of the left and the right side panels 28 and 30 also has a V-shaped projection 52 (FIG. 3) for interlocking with a portion of the reaction plate 18. The two projections 52 are mirror images of each other. Each projection 52 includes a pair of spaced apart legs 54 and 55. The leg 54 extends upward and laterally outward from its associated side panel 28 or 30. The leg 54 is tapered so that it is wider (from left to right as viewed in FIG. 3) at its base than at its tip farthest from the side panel.

The leg 55 is a mirror image of the leg 54. The leg 55 is tapered so that it is wider at its base than at its tip. The leg 55 extends downward and laterally outward from its associated side panel 28 or 30. As a result, in each one of the projections 52, the legs 54 and 55 diverge from each other as they extend away from the side panels 28, 30.

The reaction plate 18 is stamped and formed from a single piece of sheet metal. The reaction plate 18 is formed as one piece from a material having a greater stiffness and a greater strength than the material of the cover 16 of the apparatus 10. When a force is applied to a structure, there is a displacement in the direction of the force. Stiffness is the ratio of the force to the resulting displacement. High stiffness means that a large force produces a small displacement. In a material, strength refers to a level of stress at which there is a significant change in the state of the material, e.g., yielding or rupture. Preferably, the reaction plate 18 is made from steel.

Figure 2:
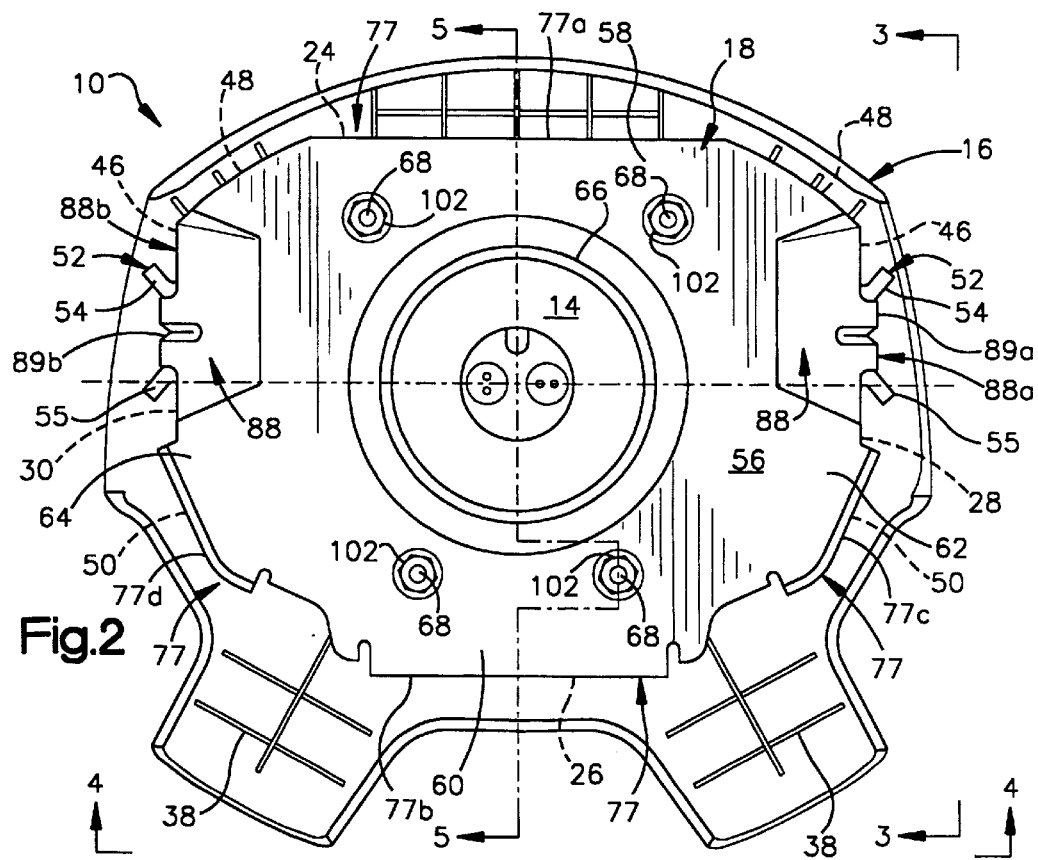
FIG. 2 is a rear elevational view of the apparatus of the present invention.
Figure 3:
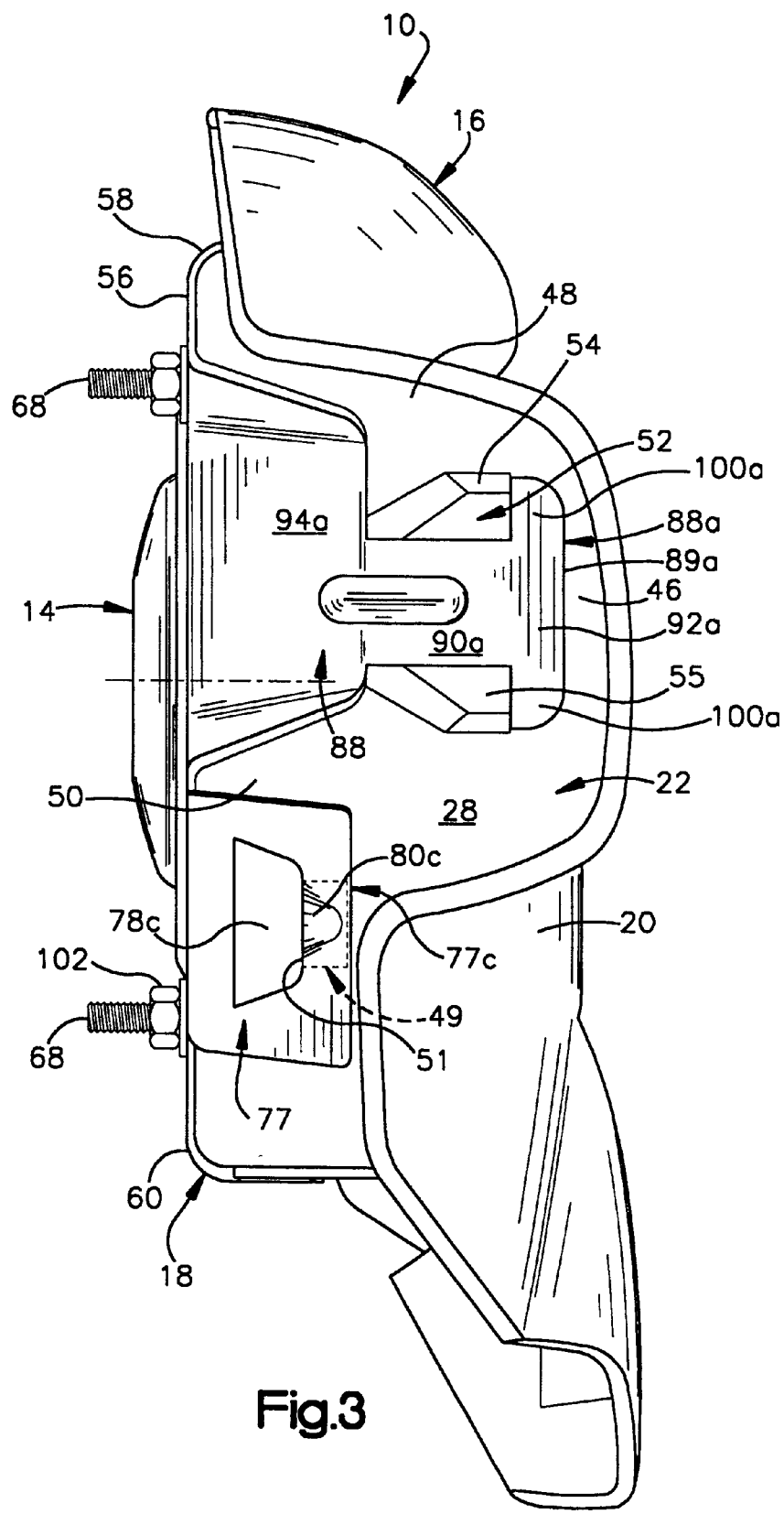
FIG. 3 is a side elevational view of the apparatus of FIG. 2 taken along line 3—3 of FIG. 2.

The reaction plate 18 has a planar base plate portion 56, shown in FIGS. 1 and 2. The base plate portion 56 is sized and shaped to cover the opening to the chamber 34 enclosed by the side panels 22 of the cover 16. The base plate portion 56 has an upper side portion 58, a lower side portion 60, a left side portion 62, and a right side portion 64. The base plate portion 56 of the reaction plate 18 has a central opening 66 and a plurality of fastener openings around the central opening.

Extending from the base portion 56 of the reaction plate 18 are a plurality of projections, or mounting flanges, for connecting the reaction plate with the cover 16. The mounting flanges are of two different types. The first type of mounting flange is numbered 77 in the drawings. The reaction plate 18 includes four of the flanges 77. One of the flanges 77a (FIG. 5) extends from the upper side portion 58 of the base plate portion 56 of the reaction plate 18. The upper flange 77a is generally planar and rectangular in configuration and has a central opening 78a. The material of the upper flange 77a is deformed inwardly (toward the inflatable device 12) adjacent to the opening 78a. The deformed material forms a lip 80a, which extends out of the plane of the flange 77a. The opening 78a is located between the lip 80a and the base plate portion 56 of the reaction plate 18.

A second one 77b (FIG. 4) of the four flanges 77 extends from the lower side portion 60 of the base plate portion 56 of the reaction plate 18. The lower flange 77b is similar in configuration to the upper flange 77a and includes a lip 80b, which extends out of the plane of the flange 77b adjacent an opening 78b in the flange.

A third one 77c (FIG. 4) of the four flanges 77 extends from the left side portion 62 of the base plate portion 56 of the reaction plate 18. The left side flange 77c has a partially curved configuration to match the curved configuration of the left side panel 28 of the cover 16. The left side flange 77c includes a lip 80c, which extends out of the plane of the flange adjacent an opening 78c in the flange.

The fourth flange 77d (FIG. 4) extends from the right side portion 64 of the base plate portion 56 of the reaction plate 18. The right side flange 77d is a mirror image of the left side flange 77c and includes a lip 80d, which extends out of the plane of the flange 77d adjacent an opening 78d in the flange.

The second type of mounting flange on the reaction plate 18 is numbered 88 in the drawings. The reaction plate includes two of the flanges, numbered 88a and 88b. The flange 88b, shown partially in FIG. 2, is a mirror image of the flange 88a.

The flange 88a (FIG. 3) includes a three-sided base portion 94a, which extends from the base plate portion 56 of the reaction plate 18. The flange 88a also has a T-shaped portion 89a, which includes a stem 90a extending substantially perpendicular to the base plate portion 56 of the reaction plate 18. The T-shaped portion 89a includes a cross bar 92a at the outer end of the stem 90a. The cross bar 92a is wider than the stem 90a and includes two side portions 100a, which project laterally from opposite sides of the stem.

The apparatus 10 includes an annular bag ring 70 (FIG. 5) located within the chamber 34 in the cover 16. The bag ring 70 has a central opening 72. A plurality of fasteners 68 in the form of threaded studs extend from an outer surface 74 of the bag ring 70.

To assemble the apparatus 10, the folded air bag 12 is placed in the chamber 34 in the cover 16. The bag ring 70 is placed into the inflation fluid opening of the air bag 12. The terminal ends 36 of the upper and lower side panels 24 and 26 are folded over the bag ring 70, so that the fasteners 68 of the bag ring 70 extend through fastener openings in the side panels 24 and 26. The mouth portion of the air bag 12 is located between the bag ring 70 and the folded terminal ends 36 of the upper and lower side panels 24 and 26.

The inflator 14 is then inserted into the opening 72 in the bag ring 70 so that its mounting flange 76 engages the bag ring 70. Next, the reaction plate 18 is aligned with the fasteners 68 on the bag ring 70, and the reaction plate is moved toward the cover 16 until the base plate portion 56 of the reaction plate engages the side panels 22 of the cover 16. Specifically, the left and right side portions 62 and 64 of the base plate portion 56 of the reaction plate 18 rest on the terminal ends 36 of the left and right side panels 28 and 30, respectively, of the cover 16. The upper and lower side portions 58 and 60 of the base plate portion 56 of the reaction plate 18 rest on the folded over portions of the upper and lower side panels 24 and 26, respectively, of the cover 16.

During this relative movement of the reaction plate 18 and the cover 16, the reaction plate and the cover interlock with one another, as each one of the flanges 77 and 88 moves into abutting engagement with its associated side panel 22 of the cover 16. Specifically, the upper flange 77a (FIG. 5) on the reaction plate 18 moves into a position outward of and overlying the upper side panel 24 of the cover 16. The lip 80a on the upper flange 77a of the reaction plate 18 snaps into the opening 42 in the upper side panel 24 of the cover 16. The interlocking engagement of the lip 80a in the opening 42 blocks relative movement of the upper flange 77a and the upper side panel 24.

The lower flange 77b on the reaction plate 18 moves into a position outward of and overlying the lower side panel 26 of the cover 16. The lip 80b on the lower flange 77b of the reaction plate 18 snaps into the opening 43 in the lower side panel 26 of the cover 16. The interlocking engagement of the lip 80b in the opening 43 blocks relative movement of the lower flange 77b and the lower side panel 26.

The left flange 77c on the reaction plate 18 moves into a position outward of and overlying the left side panel 28 of the cover 16. The lip 80c on the left flange 77c of the reaction plate 18 snaps into the opening 49 in the left side panel 28 of the cover 16. The interlocking engagement of the lip 80c in the opening 49 blocks relative movement of the left flange 77c and the left side panel 28.

The right flange 77d on the reaction plate 18 moves into a position outward of and overlying the right side panel 30 of the cover 16. The lip 80d on the right flange 77d of the reaction plate 18 snaps into the opening 49 in the right side panel 30 of the cover 16. The interlocking engagement of the lip 80d in the opening 49 blocks relative movement of the right flange 77d and the right side panel 30.

The T-shaped portion 89a (FIG. 3) of the flange 88a of the reaction plate 18 moves into engagement with the V-shaped projection 52 on the left side panel 28 of the cover 16. The crossbar 92a of the T-shaped portion 89a moves over the tapered legs 54 and 55 of the V-shaped projection 52, causing the legs 54 and 55 and the side panel 28 to deflect resiliently laterally inward. The legs 54 and 55 and the side panel 28 then snap back out to interlock with the side portions 100a of the crossbar 92a. The stem 90a of the flange 88a lies between the legs 54 and 55 of the V-shaped projection 52. The interlocking engagement of the flange 88a and the legs 54 and 55 blocks relative movement of the flange 88a and the left side panel 28.

In a similar manner, the T-shaped portion 89b of the flange 88b (FIGS. 1 and 2) of the reaction plate 18 moves into interlocking engagement with the V-shaped projection 52 on the right side panel 30 of the cover 16. After the reaction plate 18 and the cover 16 are thus interlocked, nuts 102 are screwed on the fasteners 68 to help secure the reaction plate 18 to the cover 16.

Upon sensing of a vehicle emergency, the inflator 14 is actuated and the air bag 12 begins to inflate. Because of the manner in which the air bag 12 is folded, the air bag initially inflates primarily laterally. The lateral inflation of the air bag 12 exerts a laterally directed force on the side panels 22 of the cover 16.

The reaction plate flanges 77 and 88, which are disposed outward of and overlie the side panels 22 of the cover 16, support the side panels against the laterally directed force of the inflating air bag 22, to resist deformation or rupture of the cover. In addition, the interlocking engagement of the reaction plate 18 and the cover 16 prevents movement of the cover in a direction off the reaction plate and toward the driver. The cover 16 ruptures at the tear seam 21 to allow the air bag 12 to inflate into the vehicle occupant compartment.

Preferably, the flanges 77 and 88 on the reaction plate 18 have a circumferential extent of at least 50% of the circumference of the chamber 34 in the cover 16. It is also preferred that each flange 77 or 88 extends for at least a third of the distance between the base plate portion 56 of the reaction plate 18 and the front panel 20 of the cover 16.

From the above description of the preferred embodiment of the invention, those skilled in the art will perceive improvements, changes and modifications in the invention. For example, the number, location, and form of the projections or flanges 77 and 88 of the reaction plate 18, and of the corresponding portions of the cover 16, may be modified. Such improvements, changes and modifications within the skill of the art are intended to be covered by the appended claims.

Having described the invention, we claim:

1. An apparatus for helping to protect a vehicle occupant, comprising:

an inflatable vehicle occupant protection device;

an inflator for providing inflation fluid to inflate said inflatable device;

a cover for at least partially enclosing said inflatable device and said inflator, said cover having a front panel facing the vehicle occupant and side panels laterally surrounding said inflatable device;

a reaction plate having a base plate portion to which said inflatable device, said inflator, and said cover are attached;

said reaction plate having at least one projection extending from said base plate portion, said at least one projection overlying at least a portion of at least one of said side panels of said cover to resist deformation of said at least one side panel laterally away from said inflator as said inflatable device inflates;

said at least one projection having a T-shaped portion including a stem and a crossbar, said at least one side panel having a V-shaped projection aligned with said T-shaped portion and including a pair of legs, said crossbar of said T-shaped portion engaging and resiliently deflecting said legs of said V-shaped projection laterally inward toward said inflatable device as said crossbar and said front panel of said cover move toward each other during assembly, said legs of said V-shaped projection interlocking under said crossbar of said T-shaped portion, and said stem of said T-shaped portion being disposed between said legs of said V-shaped projection.

2. The apparatus as in claim 1 further being defined by:

each leg of said V-shaped projection extending laterally outwardly from said at least one side panel, each one of said legs being tapered in a direction away from said side panel.

3. The apparatus as in claim 1 further being defined by:

said base plate portion of said reaction plate having at least two projections with T-shaped portions, said two projections being located on opposite sides of said base plate portion, said side panels of said cover having at least two V-shaped projections to interlock with said two T-shaped projections of said reaction plate.

4. An apparatus for helping to protect a vehicle occupant, comprising:

an inflatable vehicle occupant protection device;

an inflator for providing inflation fluid to inflate said inflatable device;

a cover for at least partially enclosing said inflatable device and said inflator, said cover having a front panel facing the vehicle occupant and side panels laterally surrounding said inflatable device;

a reaction plate having a base plate portion to which said inflatable device, said inflator, and said cover are attached;

said reaction plate having a plurality of projections extending from said base plate portion, each of said plurality of projections overlying at least a portion of at least one of said side panels of said cover, said plurality of projections including a first projection and a second projection, said first projection having structure that extends into and interlocks with at least one of said side panels, at least one of said side panels having structure that projects outwardly and interlocks with said second projection, said second projection extending outwardly from said base portion of said reaction plate farther than said first projection, both of said first and second projections resisting deformation of at least one of said side panels laterally away from said inflator as said inflatable device inflates.

5. The apparatus as in claim 4 further being defined by:
said structure of said first projection including a portion extending laterally inward toward said inflatable device, said at least one side panel having an opening, said laterally inward extending portion of said first projection extending into said opening in said side panel to interlock said reaction plate and said cover.

6. The apparatus as in claim 5 further being defined by:
said first projection having an opening and having a lip located on an edge of said opening farthest from said base plate portion, at least a portion of said lip extending laterally inwardly toward said inflatable device, said portion of said lip interlocking with a surface of the corresponding opening in said cover.

7. The apparatus as in claim 6 further being defined by:
said second projection including a T-shaped portion, said T-shaped portion including a stem and a crossbar, said structure of said at least one side panel aligning with said T-shaped portion and interlocking under said crossbar of said T-shaped portion when said reaction plate is moved toward said cover.

8. The apparatus as in claim 7 further being defined by:
said structure of said at least one side panel including a pair of legs, said crossbar of said T-shaped portion engaging and resiliently deflecting said legs laterally inward toward said inflatable device as said crossbar and said front panel of said cover move toward each other during assembly, said legs interlocking under said crossbar of said T-shaped portion, and said stem of said T-shaped portion being disposed between said legs.

9. The apparatus as in claim 4 further being defined by:
said second projection including a base portion that extends outwardly of the base plate portion of said reaction plate, said base portion of said second projection extending outwardly a distance that is approximately equal to a distance that said first projection extends outwardly.

10. An apparatus for helping to protect a vehicle occupant, comprising:
an inflatable vehicle occupant protection device;
an inflator for providing inflation fluid to inflate said inflatable device;
a cover for at least partially enclosing said inflatable device and said inflator, said cover having a front panel facing the vehicle occupant and side panels laterally surrounding said inflatable device;
a reaction plate having a base plate portion to which said inflatable device, said inflator, and said cover are attached;
said reaction plate having a plurality of projections extending from said base plate portion, each of said plurality of projections overlying at least a portion of at least one of said side panels of said cover, said plurality of projections including a first projection and a second projection that is spaced from said first projection, said first projection interlocking with at least one of said side panels of said cover and said second projection extending over at least one of said side panels for resisting deformation of said at least one side panel laterally away from said inflator as said inflatable device inflates;
said second projection including a first portion and a second portion, said first portion extending outwardly from said base plate portion of said reaction plate a distance approximately equal to said first projection.

11. The apparatus as in claim 10 further being defined by:
said first portion of said second projection including a three-sided base portion.

12. The apparatus as in claim 11 further being defined by:
said second portion of said second projection including a T-shaped portion, said T-shaped portion including a stem and a crossbar, said at least one side panel of said cover having a projection aligned with said T-shaped portion and interlocking with said T-shaped portion when said reaction plate is moved toward said cover.

13. The apparatus as in claim 12 further being defined by:
said projection of said cover including a pair of legs, said crossbar of said T-shaped portion engaging and resiliently deflecting said legs of said projection laterally inward toward said inflatable device as said crossbar and said front panel of said cover move toward each other during assembly, said legs of said projection interlocking under said crossbar of said T-shaped portion, and said stem of said T-shaped portion being disposed between said legs of said projection.

14. An apparatus for helping to protect a vehicle occupant, comprising:
an inflatable vehicle occupant protection device, said inflatable device being folded in a manner to initially inflate primarily in a laterally outward direction and to secondarily inflate toward the vehicle occupant;
an inflator for providing inflation fluid to inflate said inflatable device;
a cover for at least partially enclosing said inflatable device and said inflator, said cover having a front panel facing the vehicle occupant and side panels laterally surrounding said inflatable device, said inflatable device exerting a laterally outwardly directed force against said side panels of said cover as said inflatable device is inflated; and
a reaction plate having a base plate portion to which said inflatable device, said inflator, and said cover are attached;
said reaction plate further having at least one projection extending outwardly from said base plate portion, said at least one projection overlying at least a portion of a respective side panel of said cover, said at least one projection resisting said laterally outwardly directed force exerted on said respective side panel by said inflatable device and preventing deformation of said respective side panel in the laterally outward direction as said inflatable device is inflated;
wherein said side panels of said cover extend over a first distance between said front panel of said cover and said base plate portion of said reaction plate and wherein said at least one projection extends outwardly of said base plate portion by a second distance, said second distance being at least one-third said first distance; and wherein said reaction plate includes a second projection, in addition to said at least one projection, said second projection being spaced from said at least one projection and overlying at least a portion of second respective side panel of said cover, said second projection resisting said laterally outwardly directed force exerted on said second respective side panel by said inflatable device and preventing deformation of said second respective side panel in the laterally outward direction as said inflatable device is inflated, said second projection extending outwardly of said base plate portion by a third distance, said third distance being greater than said second distance.

15. An apparatus for helping to protect a vehicle occupant, comprising:

an inflatable vehicle occupant protection device, said inflatable vehicle occupant protection device being folded in a manner to initially inflate primarily in a laterally outward direction and to secondarily inflate toward the vehicle occupant;

an inflator for providing inflation fluid to inflate said inflatable vehicle occupant protection device;

a cover for at least partially enclosing said inflatable vehicle occupant protection device and said inflator, said cover having a front panel facing the vehicle occupant and a plurality of side panels laterally surrounding said inflatable vehicle occupant protection device, said inflatable vehicle occupant protection device exerting a laterally outwardly directed force against each of said plurality of side panels of said cover as said inflatable vehicle occupant protection device is inflated; and a reaction plate having a base plate portion to which said inflatable vehicle occupant protection device, said inflator, and said cover are attached;

said reaction plate further having a plurality of projections extending outwardly from said base plate portion, each of said plurality of projections being spaced apart from an adjacent one of said plurality of projections such that adjacent projections of said plurality of projections do not contact one another, each side panel of said cover being associated with a projection of said base plate portion, said associated projection overlying at least a portion of said side panel and interlocking with said side panel for resisting movement of said cover toward the vehicle occupant, at least one projection of said plurality of projections including structure that extends in a laterally inward direction for interlocking with said side panel of said cover associated with said at least one projection to resist movement of said cover toward the vehicle occupant, each projection of said plurality of projections resisting said laterally outwardly directed force exerted on said side panel associated with said projection by said inflatable vehicle occupant protection device and blocking deformation of said side panel in the laterally outward direction as said inflatable vehicle occupant protection device is inflated.

16. The apparatus as in claim 15 wherein said side panels of said cover extend over a first distance between said front panel of said cover and said base plate portion of said reaction plate and wherein said at least one of said plurality of projections extends outwardly of said base plate portion by a second distance, said second distance being at least one-third said first distance.

17. The apparatus as in claim 15 wherein said at least one of said plurality of projections has a partially curved configuration for overlying a curved portion of a respective side panel.

18. The apparatus as in claim 15 wherein said cover further includes a number of ribs located laterally outwardly of said side panels and extending between said front panel and said side panels, said number of ribs providing resistance to said laterally outwardly directed force exerted on said side panels by said inflatable vehicle occupant protection device and preventing deformation of said side panels in the laterally outward direction as said inflatable vehicle occupant protection device is inflated.

19. An apparatus for helping to protect a vehicle occupant, comprising:

an inflatable vehicle occupant protection device, said inflatable vehicle occupant protection device being folded in a manner to initially inflate primarily in a laterally outward direction and to secondarily inflate toward the vehicle occupant;

an inflator for providing inflation fluid to inflate said inflatable vehicle occupant protection device;

a cover for at least partially enclosing said inflatable vehicle occupant protection device and said inflator, said cover having a front panel facing the vehicle occupant and a plurality of side panels laterally surrounding said inflatable vehicle occupant protection device, said inflatable vehicle occupant protection device exerting a laterally outwardly directed force against each of said plurality of side panels of said cover as said inflatable vehicle occupant protection device is inflated; and a reaction plate having a base plate portion to which said inflatable vehicle occupant protection device, said inflator, and said cover are attached;

said reaction plate further having a plurality of projections extending outwardly from said base plate portion, each of said plurality of projections being spaced from an adjacent one of said plurality of projections, each side panel of said cover being associated with a projection of said base plate portion, said associated projection overlying at least a portion of said side panel and interlocking with said side panel for resisting movement of said cover toward the vehicle occupant, at least one projection of said plurality of projections including structure that extends in a laterally inward direction for interlocking with said side panel of said cover associated with said at least one projection to resist movement of said cover toward the vehicle occupant, each projection of said plurality of projections resisting said laterally outwardly directed force exerted on said side panel associated with said projection by said inflatable vehicle occupant protection device and blocking deformation of said side panel in the laterally outward direction as said inflatable vehicle occupant protection device is inflated;

wherein at least one of said side panels includes structure that extends in the laterally outward direction for interlocking with an overlying projection of said plurality of projections.

* * * * *